United States Patent
Yu et al.

(10) Patent No.: US 6,217,795 B1
(45) Date of Patent: Apr. 17, 2001

(54) LOW VOLTAGE BLUE EMITTING PHOSPHOR AND METHOD OF PREPARING SAME

(75) Inventors: Il Yu, Suwon-si; Yong-chan You, Seoul; Mi-ran Song, Suwon-si, all of (KR)

(73) Assignee: Samsung Display Devices Co., Ltd., Kyungki-do (KR)

(*) Notice: Subject to any disclaimer, the term of this patent is extended or adjusted under 35 U.S.C. 154(b) by 0 days.

(21) Appl. No.: 09/447,094

(22) Filed: Nov. 22, 1999

(30) Foreign Application Priority Data

Nov. 24, 1998 (KR) .................................................. 98-50399

(51) Int. Cl.$^7$ .................................................. C09K 11/54
(52) U.S. Cl. .................................................. 252/301.6 R
(58) Field of Search ...................................... 252/301.6 R

(56) References Cited

U.S. PATENT DOCUMENTS 5,478,499    12/1995    Satoh et al. ........................ 252/301.6

Primary Examiner—C. Melissa Koslow
(74) Attorney, Agent, or Firm—Christie, Parker & Hale, LLP

(57) ABSTRACT

Disclosed is a low voltage blue emitting phosphor and a method for producing the same including the steps of: mixing ZnO, $Ga_2O_3$ and a Na-based compound to obtain a mixture material; sintering the material at a temperature of 1100 to 1300° C.; milling the first sintered material; washing the milled material using hydrochloric acid; sintering the washed material at a temperature of 800 to 1100° C.; and classifing the material. The low voltage blue emitting phosphor produced as described above is a $ZnO—Ga_2O_3$ matrix doped with Na, and has an x value of 0.18±0.05 and a y value of 0.17±0.05 in a CIE chromaticity diagram.

3 Claims, 1 Drawing Sheet

LOW VOLTAGE BLUE EMITTING PHOSPHOR AND METHOD OF PREPARING SAME

CROSS REFERENCE TO RELATED APPLICATION

This application is based on application No. 98-50399 filed in the Korean Industrial Property Office on Nov. 24, 1998, the content of which is incorporated herein by reference.

FIELD OF THE INVENTION

The present invention relates to a low voltage blue emitting phosphor with improved brightness and a method of preparing the same.

BACKGROUND OF THE INVENTION

U.S. Pat. No. 5,478,499 discloses a blue emitting phosphor that can be used in a vacuum fluorescent display, a field emission display, a write head of a printer, a back light for a liquid crystal display, etc. The phosphor of the '499 patent is capable of emitting a blue luminous color at a voltage of 100V or less. The phosphor is a $ZnO$—$Ga_2O_3$ matrix doped with Li (lithium) and P (phosphorus).

FIG. 2 shows a flow chart of a method for preparing the above blue emitting phosphor of the '499 patent. First, ZnO, $Ga_2O_3$, and $Li_3PO_4$ are mixed. Next, the resulting mixture is subjected to a first sintering step for approximately 3 hours at a temperature of 1200° C. and in a normal air atmosphere. The matrix is then milled, preferably with a ball mill, such that lumped matrix particles are evenly dispersed. To remove excess $Li_3PO_4$, the dispersed matrix particles are washed with nitric acid. Subsequently, the washed matrix is subjected to a second sintering step for 1 to 3 hours at a temperature of 1100° C. under a reducing atmosphere. Subsequently, the matrix is classified using a sieve, thereby obtaining the phosphor. The phosphor has an x value of 0.08 to 0.20 and a y value of 0.05 to 0.25 in a CIE chromaticity diagram. However, the blue emitting phosphor produced as described above has a low brightness, i.e., a low light emitting efficiency.

SUMMARY OF THE INVENTION

It is an object of the present invention to provide a low voltage blue emitting phosphor having improved brightness, i.e., an improved light emitting efficiency. It is another object of the present invention to provide a method of preparing the low voltage blue emitting phosphor.

To achieve the above objects, the present invention provides a low voltage blue emitting phosphor and a method of preparing the same. The method includes the steps of mixing ZnO, $Ga_2O_3$ and an Na-based compound to obtain a mixture; sintering the mixture at a temperature of 1100 to 1300° C.; milling the material; washing the milled material using hydrochloric acid; sintering the washed material at a temperature of 800 to 1100° C.; and classifying the material.

The low voltage blue emitting phosphor produced according to the inventive method described above has an x value of 0.18±0.05 and a y value of 0.17±0.05 in a CIE chromaticity diagram.

BRIEF DESCRIPTION OF THE DRAWINGS

The accompanying drawings, which are incorporated in and constitute a part of the specification, illustrate an example of the invention, and, together with the description, serve to explain the principles of the invention.

DETAILED DESCRIPTION

The present invention will now be described in detail with reference to FIG. 1.

Figure 1:
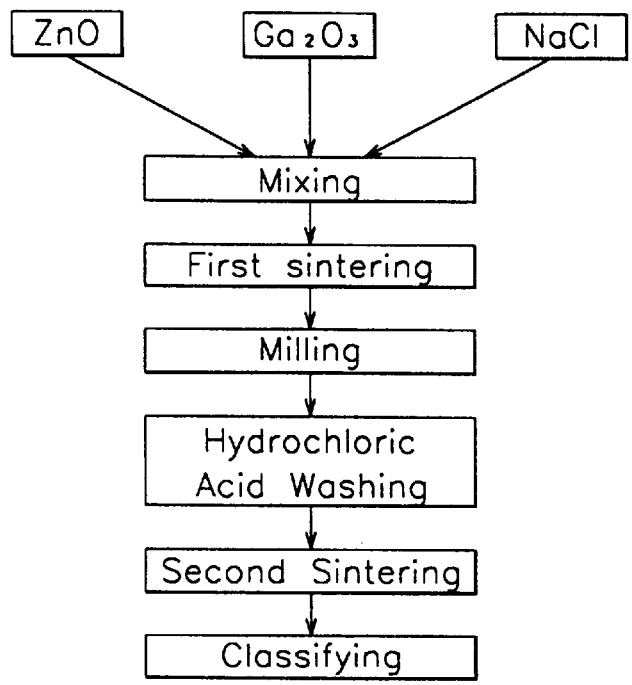
FIG. 1 is a flow chart of a method for preparing a low voltage blue emitting phosphor according to the present invention.
Figure 2:
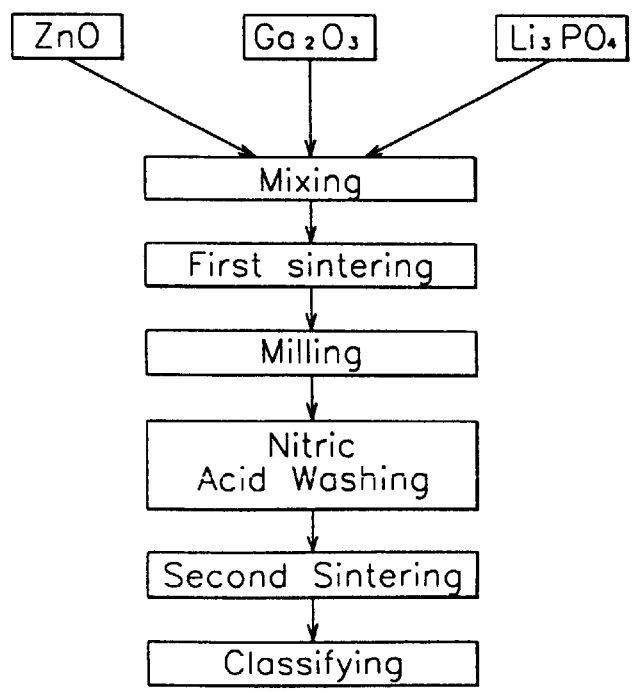
FIG. 2 is a flow chart of a prior art method for preparing a low voltage blue emitting phosphor.

FIG. 1 shows a flow chart of a method for preparing a low voltage blue emitting phosphor according to the present invention. In a first step, ZnO, $Ga_2O_3$ and an Na-based compound are mixed to obtain a mixture. The molar ratio of ZnO to $Ga_2O_3$ is preferably 1:1. The brightness of the phosphor of the present invention decreases if a different molar ratio between these compounds is used. It is possible to use NaCl, $Na_2CO_3$, $Na_3PO_4$ or NaBr as the Na-based compound. The Na-based compound acts as a flux to grow a particle diameter of the phosphor and to adjust the shape of the particles.

In the present invention, the Na-based compound, in addition to growing the particle diameter of the phosphor and adjusting the shape of the particles, also acts as an activator. It is preferred that the Na-based compound is 10–30 mole % of the total phosphor.

The mixture obtained in the ratio disclosed above is then subjected to a first sintering step at a temperature of 1100 to 1300° C. It is preferred that the first sintering step is performed at 1200° C. in a normal air atmosphere for approximately 3 hours. A $ZnO$—$Ga_2O_3$ matrix is formed through the first sintering step. Next, the first sintered mixture is milled. Preferably, ball milling is performed to remove lumped particles and to improve dispersion and particle distribution. The material having undergone ball milling is then washed using hydrochloric acid at a concentration of 1%. Excess Na-based compounds are removed during the washing process such that Na does not influence the matrix during a second sintering step.

After the above step, a second sintering step is performed on the washed material. The second sintering step is performed at a temperature of 800 to 1100° C. To make an oxygen-deficient atmosphere for improving electric conductivity, the second sintering step is preferably performed for 2 hours at a temperature of 900° C. under a reduced atmosphere. Finally, the material is classified using a sieve, thereby producing the low voltage blue emitting phosphor according to the present invention.

The low voltage blue emitting phosphor produced as described above has an x value of 0.18±0.05 and a y value of 0.17±0.05 in a CIE chromaticity diagram.

The present invention is fiurther explained in more detail with reference to the following examples. The invention can be utilized in various ways and is not intended to be confined to the examples.

EXAMPLE 1

ZnO, $GaO_3$ and NaCl were fully mixed using a mortar to produce a mixture. A first sintering step was performed on the mixture for 3 hours at a temperature of 1200° C. Next, the first sintered mixture was washed using hydrochloric acid at a concentration of 1%. A second sintering step was then performed on the washed material for 2 hours at a temperature of 1000° C. After the second sinteing step, the material was classified, thereby producing a low voltage blue emitting phosphor.

The low voltage blue emitting phosphor produced as described above had an x value of 0.180 and a y value of 0.170 in a CIE chromaticity diagram.

COMPARATIVE EXAMPLE 1

98 g of ZnO, 225 g of $Ga_2O_3$ and 45 g of $Li_3PO_4$ were fully mixed using a mortar to produce a mixture. Next, the mixture was sintered in a normal air atmosphere for 3 hours at a temperature of 1200° C. After sintering, the material was washed using 0.5N of nitric acid. The washed material then underwent sintering for 2 hours at a temperature of 1100° C. in a reduced atmosphere. Finally, the sintered material was classified, thereby producing a low voltage blue emitting phosphor.

The low voltage blue emitting phosphor thereby produced had an x value of 0.18 and a y value of 0.17 in a CIE chromaticity diagram.

In the low voltage blue emitting phosphor of the present invention, Na-based compound is used instead of $Li_3PO_4$ as a flux. Accordingly, a 15% improvement in brightness is realized such that a low voltage display device having superior light emitting efficiency can be produced.

Although a preferred example of the present invention has been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method of producing a low voltage blue emitting phosphor comprising:

mixing ZnO, $Ga_2O_3$ and at least one Na-based compound to obtain a mixture material;

sintering the material at a temperature of 1100 to 1300° C.;

milling the sintered material;

washing the milled material using hydrochloric acid;

sintering the washed material at a temperature of 800 to 1100° C.; and classifying the material.

2. The method of claim 1 wherein the at least one Na-based compound is selected from the group consisting of NaCl, $Na_2CO_3$, $Na_3PO_4$, and NaBr.

3. A low voltage blue emitting phosphor comprising a ZnO—$Ga_2O_3$ matrix doped with Na and having an x value of 0.18±0.05 and a y value of 0.17±0.05 in a CIE chromaticity diagram, the low voltage blue emitting phosphor being prepared by the steps of:

mixing ZnO, $Ga_2O_3$ and a Na-based compound to obtain a mixture material;

sintering the material at a temperature of 1100 to 1300° C.;

milling the first sintered material;

washing the milled material using hydrochloric acid;

sintering the washed material at a temperature of 800 to 1100° C.; and classifying the material.

* * * * *